(12) United States Patent
Kahlon et al.

(10) Patent No.: US 8,489,470 B2
(45) Date of Patent: *Jul. 16, 2013

(54) INVENTORY LOCATION COMMON OBJECT

(75) Inventors: Paramjit Kahlon, San Mateo, CA (US);
Nardo B. Catahan, Jr., S. San Francisco, CA (US); Shailendra Garg, Sunnyvale, CA (US); Maria Theresa Barnes-Leon, Fremont, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1530 days.

This patent is subject to a terminal disclaimer.

(21) Appl. No.: 10/696,156

(22) Filed: Oct. 28, 2003

(65) Prior Publication Data

US 2007/0214064 A1 Sep. 13, 2007

Related U.S. Application Data

(60) Provisional application No. 60/457,271, filed on Mar. 24, 2003.

(51) Int. Cl.
*G06G 1/14* (2006.01)
*G06Q 10/00* (2012.01)

(52) U.S. Cl.
USPC .............................................. 705/28; 705/22

(58) Field of Classification Search
USPC .................................................... 705/22, 28
See application file for complete search history.

(56) References Cited

U.S. PATENT DOCUMENTS

| 4,714,995 | A | 12/1987 | Materna et al. ............... 364/200 |
|---|---|---|---|
| 5,220,500 | A | 6/1993 | Baird et al. ................. 705/36 R |
| 5,311,438 | A | 5/1994 | Sellers et al. ................... 700/96 |
| 5,349,643 | A | 9/1994 | Cox et al. ......................... 380/25 |
| 5,416,917 | A | 5/1995 | Adair et al. .................... 707/203 |
| 5,446,880 | A * | 8/1995 | Balgeman et al. ................ 707/9 |
| 5,566,332 | A | 10/1996 | Adair et al. .................... 707/101 |
| 5,646,862 | A | 7/1997 | Jolliffe et al. ....................... 703/1 |
| 5,699,527 | A | 12/1997 | Davidson ........................ 705/38 |
| 5,708,828 | A * | 1/1998 | Coleman ....................... 715/205 |
| 5,724,575 | A | 3/1998 | Hoover et al. .................. 707/10 |
| 5,727,158 | A | 3/1998 | Bouziane et al. ............. 709/225 |
| 5,742,588 | A | 4/1998 | Thornberg et al. ........... 370/236 |
| 5,758,355 | A | 5/1998 | Buchanan ..................... 707/201 |

(Continued)

FOREIGN PATENT DOCUMENTS

| DE | 101 50 391 A1 | 5/2002 |
|---|---|---|
| JP | 2001 256308 | 9/2001 |

(Continued)

OTHER PUBLICATIONS

"Cross Access Introduces SERIESfour; Offers Native, Fast, Scalable Legacy Data Connectivity for Data Marts, ERP Applications," PR Newswire; New York; Jan. 18, 1999; pp. 1-3. Downloaded from http://proquest.umit.com.

(Continued)

*Primary Examiner* — Fahd Obeid
(74) *Attorney, Agent, or Firm* — Campbell Stephenson LLP

(57) ABSTRACT

Stored inventory location information in a first format for use by a first computerized system is transformed to readily make the stored inventory location information available for use in a second computerized system that utilizes a second format in a cost-efficient and time-efficient manner.

30 Claims, 18 Drawing Sheets

U.S. PATENT DOCUMENTS

| | | | |
|---|---|---|---|
| 5,764,543 A | 6/1998 | Kennedy | 703/2 |
| 5,806,075 A | 9/1998 | Jain et al. | 707/201 |
| 5,930,156 A | 7/1999 | Kennedy | 703/6 |
| 5,930,764 A | 7/1999 | Melchione et al. | 705/10 |
| 5,953,710 A | 9/1999 | Fleming | 705/38 |
| 5,970,490 A | 10/1999 | Morgenstern | 707/10 |
| 5,983,194 A | 11/1999 | Hogge et al. | 705/7 |
| 6,032,136 A | 2/2000 | Brake et al. | 705/41 |
| 6,053,947 A | 4/2000 | Parson | 703/14 |
| 6,167,380 A | 12/2000 | Kennedy et al. | 705/10 |
| 6,178,418 B1 | 1/2001 | Singer | 707/3 |
| 6,182,053 B1 | 1/2001 | Rauber et al. | 705/28 |
| 6,216,130 B1 | 4/2001 | Hougaard et al. | 707/10 |
| 6,226,649 B1 | 5/2001 | Bodamer et al. | 707/104.1 |
| 6,233,566 B1 | 5/2001 | Levine et al. | 705/36 R |
| 6,236,997 B1 | 5/2001 | Bodamer et al. | 707/10 |
| 6,275,812 B1 | 8/2001 | Haq et al. | 705/11 |
| 6,336,124 B1 | 1/2002 | Alam et al. | 715/523 |
| 6,341,289 B1 | 1/2002 | Burroughs et al. | 707/104.1 |
| 6,343,275 B1 | 1/2002 | Wong | 705/26 |
| 6,377,952 B1 | 4/2002 | Inohara et al. | 707/101 |
| 6,385,620 B1 | 5/2002 | Kurzius et al. | 707/104.1 |
| 6,434,567 B1 | 8/2002 | De La Huerga | 707/102 |
| 6,463,430 B1 | 10/2002 | Brady et al. | 707/3 |
| 6,556,950 B1 | 4/2003 | Schwenke et al. | 702/183 |
| 6,569,207 B1 | 5/2003 | Sundaresan | 715/234 |
| 6,591,260 B1 | 7/2003 | Schwarzhoff et al. | 702/2 |
| 6,631,382 B1 | 10/2003 | Kouchi et al. | 707/102 |
| 6,668,253 B1 | 12/2003 | Thompson et al. | 707/10 |
| 6,681,223 B1 | 1/2004 | Sundaresan | 707/6 |
| 6,738,975 B1 | 5/2004 | Yee et al. | 719/310 |
| 6,754,679 B2 | 6/2004 | Oheda | 707/201 |
| 6,778,651 B1 | 8/2004 | Jost et al. | 379/201.01 |
| 6,792,431 B2 | 9/2004 | Tamboli et al. | 707/102 |
| 6,826,542 B1 | 11/2004 | Virgin et al. | 705/34 |
| 6,826,568 B2 | 11/2004 | Bernstein et al. | 707/6 |
| 6,828,963 B1 | 12/2004 | Rappoport | 345/419 |
| 6,883,004 B2 | 4/2005 | Bahl et al. | 707/10 |
| 6,889,260 B1 | 5/2005 | Hughes | 709/246 |
| 6,898,783 B1 | 5/2005 | Gupta et al. | 717/105 |
| 6,912,719 B2 | 6/2005 | Elderon et al. | 719/319 |
| 6,944,514 B1 | 9/2005 | Matheson | 700/98 |
| 6,947,947 B2 | 9/2005 | Block et al. | 707/102 |
| 6,961,760 B2 | 11/2005 | Li et al. | 709/219 |
| 6,996,776 B1 | 2/2006 | Makely et al. | 715/207 |
| 7,013,485 B2 | 3/2006 | Brown et al. | 726/27 |
| 7,043,687 B2 | 5/2006 | Knauss et al. | 715/236 |
| 7,062,540 B2 | 6/2006 | Reddy et al. | 709/217 |
| 7,065,499 B1 | 6/2006 | Seth et al. | 705/26 |
| 7,085,729 B1 | 8/2006 | Kennedy et al. | 705/10 |
| 7,093,200 B2 | 8/2006 | Schreiber et al. | 715/835 |
| 7,099,350 B2 | 8/2006 | Peterson | 370/465 |
| 7,111,010 B2 | 9/2006 | Chen | 707/102 |
| 7,111,011 B2 | 9/2006 | Starkovich et al. | 709/246 |
| 7,124,112 B1 | 10/2006 | Guyan et al. | 705/44 |
| 7,133,882 B1 | 11/2006 | Pringle et al. | 1/1 |
| 7,139,766 B2 | 11/2006 | Thomson et al. | 707/101 |
| 7,143,100 B2 | 11/2006 | Carlson et al. | 707/101 |
| 7,162,540 B2 | 1/2007 | Jasen et al. | 709/242 |
| 7,257,594 B2 | 8/2007 | Tamboli et al. | 701/101 |
| 7,257,820 B2 | 8/2007 | Fischer et al. | 719/316 |
| 7,287,041 B2 | 10/2007 | Barnes-Leon et al. | 707/104.1 |
| 7,337,192 B2 | 2/2008 | Stark et al. | 707/104.1 |
| 7,349,861 B1 | 3/2008 | Fischer et al. | 705/7 |
| 7,370,009 B1 | 5/2008 | Notani et al. | 705/28 |
| 7,412,404 B1 | 8/2008 | Tenorio | 715/236 |
| 7,680,818 B1 | 3/2010 | Fan et al. | 707/999.103 |
| 2001/0011245 A1 | 8/2001 | Duhon | 705/30 |
| 2001/0051907 A1 | 12/2001 | Kumar et al. | 705/36 |
| 2002/0007343 A1 | 1/2002 | Oyama et al. | 705/39 |
| 2002/0019765 A1 | 2/2002 | Mann et al. | 705/11 |
| 2002/0023004 A1 | 2/2002 | Hollander et al. | 705/22 |
| 2002/0035431 A1 | 3/2002 | Ell | 702/5 |
| 2002/0035488 A1 | 3/2002 | Aquila et al. | 705/4 |
| 2002/0040313 A1 | 4/2002 | Hunter et al. | 705/9 |
| 2002/0040339 A1 | 4/2002 | Dhar et al. | 705/38 |
| 2002/0085020 A1 | 7/2002 | Carroll, Jr. | 345/700 |
| 2002/0095456 A1 | 7/2002 | Wensheng | 709/203 |
| 2002/0116234 A1 | 8/2002 | Nagasawa | 705/5 |
| 2002/0123983 A1 | 9/2002 | Riley et al. | 707/1 |
| 2002/0133510 A1 | 9/2002 | Lau | 707/203 |
| 2002/0138582 A1 | 9/2002 | Chandra et al. | 709/206 |
| 2002/0169863 A1 | 11/2002 | Beckwith et al. | 709/223 |
| 2002/0169867 A1 | 11/2002 | Mann et al. | 709/224 |
| 2002/0174417 A1 | 11/2002 | Sijacic et al. | 717/147 |
| 2002/0178077 A1* | 11/2002 | Katz et al. | 705/26 |
| 2002/0184085 A1 | 12/2002 | Lindia et al. | 705/11 |
| 2002/0184148 A1 | 12/2002 | Kahn et al. | 705/40 |
| 2002/0188513 A1 | 12/2002 | Gil et al. | 705/22 |
| 2002/0188538 A1 | 12/2002 | Robertson et al. | 705/35 |
| 2003/0014440 A1 | 1/2003 | Bussert et al. | 715/239 |
| 2003/0018502 A1 | 1/2003 | Rodriguez | 705/7 |
| 2003/0023580 A1 | 1/2003 | Braud et al. | 703/3 |
| 2003/0071852 A1 | 4/2003 | Stimac | 345/810 |
| 2003/0097642 A1 | 5/2003 | Arai et al. | 716/1 |
| 2003/0131018 A1 | 7/2003 | Godoy et al. | 707/104.1 |
| 2003/0163597 A1 | 8/2003 | Hellman et al. | 709/316 |
| 2003/0163603 A1 | 8/2003 | Fry et al. | 709/328 |
| 2003/0229529 A1 | 12/2003 | Mui et al. | 705/8 |
| 2004/0002982 A1 | 1/2004 | Ersek et al. | 1/1 |
| 2004/0015515 A1 | 1/2004 | Beisiegel et al. | 707/103 Y |
| 2004/0034661 A1 | 2/2004 | Barron et al. | 707/104.1 |
| 2004/0039576 A1* | 2/2004 | He et al. | 705/1 |
| 2004/0093351 A1 | 5/2004 | Lee et al. | 707/104.1 |
| 2004/0122826 A1 | 6/2004 | Mackie | 707/100 |
| 2004/0128188 A1 | 7/2004 | Leither et al. | 705/11 |
| 2004/0162773 A1 | 8/2004 | Del Rey et al. | 705/36 |
| 2004/0199536 A1 | 10/2004 | Barnes-Leon et al. | 705/26 |
| 2004/0215503 A1 | 10/2004 | Allpress et al. | 705/11 |
| 2004/0249854 A1 | 12/2004 | Barnes-Leon et al. | 703/103 Y |
| 2005/0021383 A1 | 1/2005 | Fliess et al. | 705/8 |
| 2005/0021391 A1 | 1/2005 | Lu et al. | 705/11 |
| 2005/0091249 A1 | 4/2005 | Hanson et al. | 707/101 |
| 2005/0160361 A1 | 7/2005 | Young | 715/513 |
| 2005/0197880 A1 | 9/2005 | Walsh et al. | 705/8 |
| 2006/0271446 A1 | 11/2006 | Barnes-Leon et al. | 705/26 |
| 2007/0033531 A1 | 2/2007 | Marsh | 715/738 |
| 2007/0203710 A1 | 8/2007 | Habichler et al. | 705/1 |
| 2007/0208577 A1 | 9/2007 | Barnes-Leon et al. | 705/1 |
| 2007/0208878 A1 | 9/2007 | Barnes-Leon et al. | 709/246 |
| 2007/0214020 A1 | 9/2007 | Srinivasan et al. | 705/4 |
| 2007/0214063 A1 | 9/2007 | Kahlon et al. | 705/28 |
| 2007/0214064 A1 | 9/2007 | Kahlon et al. | 705/28 |
| 2007/0214065 A1 | 9/2007 | Kahlon et al. | 705/28 |
| 2007/0225949 A1 | 9/2007 | Sundararajan et al. | 703/2 |
| 2007/0226037 A1 | 9/2007 | Garg et al. | 705/1 |
| 2007/0226049 A1 | 9/2007 | Muralitharan et al. | 705/11 |
| 2007/0226093 A1 | 9/2007 | Chan et al. | 705/38 |
| 2007/0250408 A1 | 10/2007 | Barnes-Leon et al. | 707/100 |
| 2007/0250419 A1 | 10/2007 | Kumar et al. | 705/34 |
| 2007/0265944 A1 | 11/2007 | Catahan, Jr. et al. | 705/30 |

FOREIGN PATENT DOCUMENTS

| | | | |
|---|---|---|---|
| WO | WO 0143031 A1 | 6/2001 | |
| WO | WO 03/088759 A1 | 11/2001 | |
| WO | WO 03/003641 A2 | 1/2003 | |

OTHER PUBLICATIONS

Hardwick, Martin, David L. Spooner, Rom Rando, and K.C. Morris, "Sharing Manufacturing Information in Virtual Enterprises;" Communication of the ACM; vol. 39, No. 2; Feb. 1996; pp. 46-54. Downloaded from http://delivery.acm.org.

Kappelhoff, Ralph, "Integration of ERP to the Final Control Elements;" ISA Transactions; 1998; vol. 36, No. 4; pp. 229-238. Downloaded from http://www.sciencedirect.com.

Nori, Anil K. et al., "Bringing Objects to the Mainstream," Compcon Proceedings, IEEE San Jose, California, Feb. 23-26, 1997, pp. 136-142.

PTC: Siebel Systems and PTC create strategic alliance to leverage entriched information across product development, sales and service; Combination of Siebel eBusiness Applications and PTC Collaborative Product Development solutions to deliver competitive advantage, M2 Presswire, Conventry: Jan. 24, 2002, 3 pages (retrieved from ProQuest.com).

Wilson, J.R., "Aerospace Looks for Lift from e-commerce," Intervia, Geneva, Jul./Aug. 2001; vol. 56, Issue 655, 6 pages (retrieved from ProQuest.com).

XML/EDI Group. "Guidelines for using XML Electronic Data Interchange." Presented at XML One-San Jose, Sep./Oct. 2001. Downloaded from http://web.archive.org/web/20040413182700/http://www.xmledi-group.org/.

NPL_XML_Schema_CE.pdf, A tutorial published by the SML governing body of w3.org regarding the use of SML Schemas and Complex Data Elements. Downloaded on Jun. 10, 2009 from http://www.w3schools.com/Schema/schema_intro.asp? and http://www.w3schools.com/Schema/schema_complex.asp? and http:/www.w3.schools.com/Schema/schema_complex empty.asp?;7 pages.

Routledge et al., UML and XML Schema, 2002, pp. 1-10.

Walter J. Savitch, Java an Introduction to Computer Science & Programming, 2000, p. 478.

Walter J. Savitch, Java an Introduction to Computer Science & Programming, 2000, pp. 458-467.

Walter J. Savitch, Java an Introduction to Computer Science & Programming, 2000, p. 1.

Anonymous; "HR-XML Consortium Sponsors Panel Discussion/Demonstrates Draft Protocol at IHRIM Conference and Expo;" Business Wire; Jun. 28, 2000; 4 pages.

"Fortis Investments Implements Unified Employee Management System Across 12 Countries" (Business Wire, Jul. 2004).

"Extract simplifies file conversion" Software Markets, Dec. 2, 1991. Retrieved via Dialog on Aug. 16, 2010.

Cover Pages "Siebel's Universal Application Network" Apr. 8, 2002 downloaded from xml.coverpages.org May 6, 2010.

Cover Pages "Siebel Announces Success with Universal Application Network (UAN)" Apr. 21, 2004 downloaded from xml.coverpages.org May 6, 2010.

Michael Kay, Editor "XSL Transformations (XSLT) Version 2.0 W3C Working Draft May 2, 2003" downloaded from http://www.w3.org/TR/2003/WD-xslt20-20030502/ May 6, 2010.

Eric Gropp "Transforming XML Schemas" Jan. 15, 2003, downloaded from xml.com May 6, 2010.

Seminerio, Maria, "Job Agencies Will Hire HR-XML—Protocol Promises a Lingua Franca for Resumes;" eWeek; Jan. 1, 2001; vol. 18, Issue 1; p. 45.

Sonic Software Corporation, Power Schemas With Stylus Studio™; Jan. 2004.

Ohlhorst, Frank J., "ScanSoft's OmniForm Fills Bill for Forms—Driven Customers," CRN; Jericho: Feb. 17, 2003, Issue 1033; p. 51 (1 page).

\* cited by examiner

INVENTORY LOCATION COMMON OBJECT

CROSS REFERENCE TO RELATED APPLICATIONS

This application claims the benefit of U.S. Provisional Patent Application No. 60/457,271 filed Mar. 24, 2003, entitled, "INVENTORY LOCATION SYNCHRONIZATION AND COMMON OBJECT," by Kahlon et al., and which is hereby incorporated by reference in its entirety.

TECHNICAL FIELD

The present invention is directed to the field of data modeling in the context of enterprise resources planning and customer relations management, and more specifically to inventory management.

BACKGROUND

Manufacturers and suppliers of products use back-office computerized systems to provide support for functions in enterprise resources planning (ERP). Such functions include manufacturing, marketing, inventory control, procurement and financing.

Also available are front-office computerized systems, which provide support to product vendors and distributors. In the context of inventory management, such front-office functions include analysis of historical customer demand for products, stocking and replenishment of inventory, and providing information resources for delivery of inventory and service to consumers. In order to take advantage of such front-office software computerized systems, their users typically must store data in forms usable by the front-office computerized system, which often differ significantly from the forms usable with back-office computerized systems.

Thus, when some or all aspects of inventory are managed by both back-office and front-office computerized systems, there is a need to synchronize the inventory information in both computerized systems. Generally, in order for front-office computerized systems to communicate with back-office computerized systems that are already being used, the user must manually regenerate data from the back-office computerized systems in forms usable by the front-office computerized systems, and vice versa. Such manual regeneration has several significant disadvantages, including: (1) it is often expensive; (2) it often requires a substantial amount of time to complete; (3) it must be repeated each time data changes in either the back-office system or the front-office system; and (4) it is prone to errors.

In view of the foregoing, an automated approach for transforming data used by a back-office computerized system for use by a front-office computerized system, and vice versa, is needed.

DETAILED DESCRIPTION

Figure 1A:
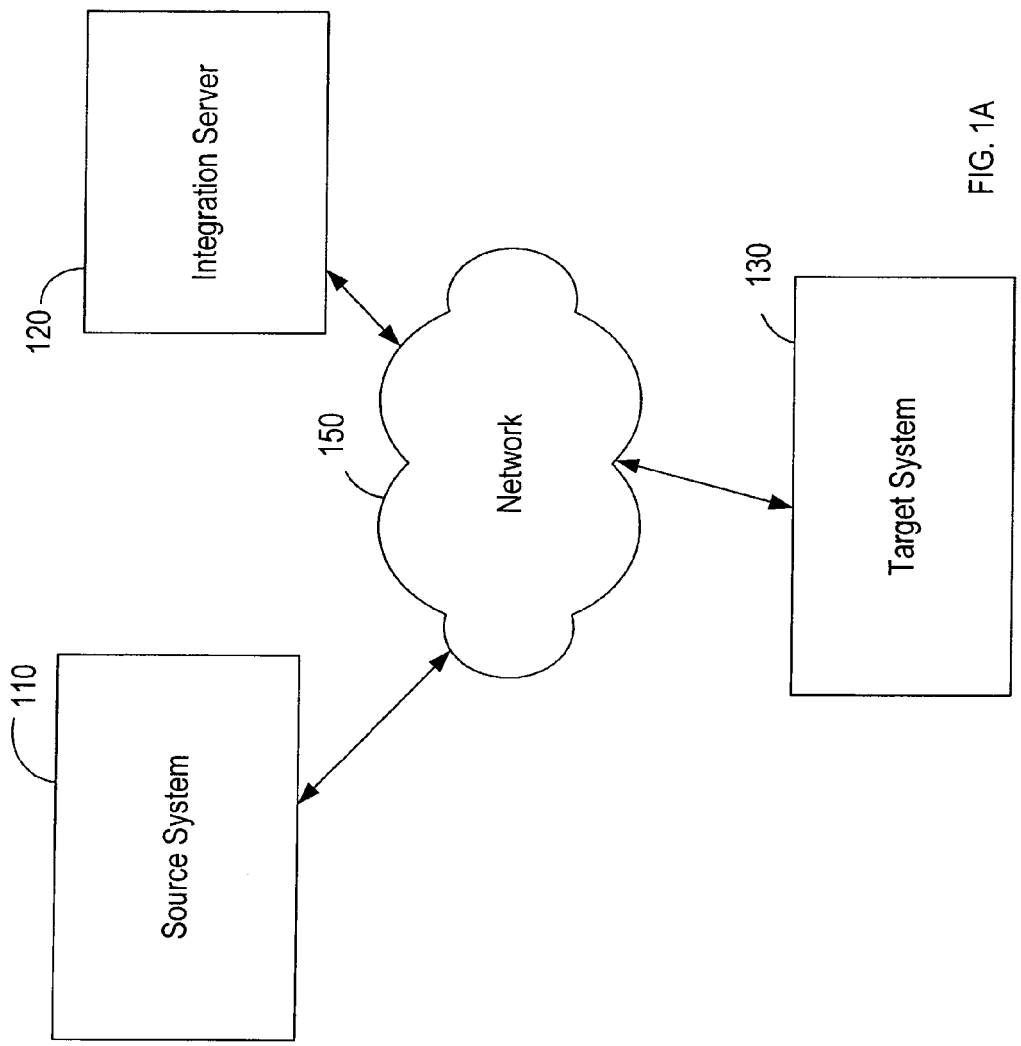
FIG. 1A is a high level network diagram showing aspects of a computerized environment in which the facility operates, according to certain embodiments.

According to certain embodiments, the synchronization of inventory information addresses the needs of a company that deploys multiple computer applications, obtained from multiple vendors of computer applications, in the company's inventory management system. The synchronization operation provides a user of the inventory management system the same view of the inventory information across the various computer applications. All changes in the inventory information need to be captured and made accessible to all relevant computer applications in the inventory management system. For example, when an inventory item is received into inventory, shipped for an order, or has a change in its availability status (such as "reserved" status from "on hand" status), such inventory information need to be captured and made accessible to relevant computer applications in the inventory management system.

For purposes of explanation, assume that a company's inventory management system includes a front-office system (target system) for customer interfacing operations. Further, assume that the company's inventory management system also includes a back-office system (source system) that includes an inventory cost accounting application, for example. The computer applications of the front-office system uses a data model that is distinct from the data model used in back-office system's computer applications.

Inventory items are physically stored in a central distribution warehouse, at a field service office, in one or more field service engineer's trunk, or at a third party vendor's location. Assume that the various computer applications associated with inventory management used by the central distribution warehouse, the field service office, the field service engineer, and the third party vendor, are part of the target system. An inventory cost accounting application, for example, from the source system will need to share inventory information with the target system computer applications. Thus, a common data storage model is needed so that the various computer applications across the company's inventory management system can share the inventory information.

An important piece of information in inventory management is the inventory location information. For example, when a front-office call center receives an order from a customer, the call center needs to access inventory location information that is maintained by the back-office system in order to fill the customer order.

A software facility (hereafter "the facility") for automatically converting inventory location information, is described. In some embodiments, the facility converts inventory location information from a form used by the source system to a form used by the target system. In certain embodiments, source systems may be back-office systems providing support for such functions as manufacturing, marketing, inventory control, procurement and financing. In certain embodiments, target systems may be front-office system providing support for such functions as analysis of historical customer demand for products, stocking and replenishment of inventory, and providing information resources for delivery of inventory and service to consumers, and sales.

In some embodiments, such as embodiments adapted to converting inventory location information in the first source format, the facility converts inventory location information by converting the inventory location information that is in the first source format into an intermediate format. The intermediate format is then used to convert the inventory location information into the target format.

By performing such conversions, embodiments of the facility enable a user of a first computerized system who has stored inventory location information in a first format for use by the first computerized system to readily make the stored inventory location information available for use in a second computerized system that utilizes a second format in a cost-efficient and time-efficient manner.

FIG. 1A is a network diagram showing aspects of a typical hardware environment in which the facility operates. FIG. 1A shows a source system 110, a target system 130, an integration server 120 and a network 150. Source system 110 stores inventory location information in a source format. There may be more than one source system. Target system 130 stores inventory location information in a target format. Target system 130 is described in greater detail herein, with reference to FIG. 1B.

The facility (not shown) converts some or all inventory location information that is in the source format into the target format by using an intermediate format of the inventory location information. In certain embodiments, such conversions are performed with the aid of one or more other computer systems, such as integration server system 120. Components of the facility may reside on and/or execute on any combination of these computer systems, and intermediate results from the conversion may similarly reside on any combination of these computer systems.

The computer systems shown in FIG. 1A are connected via network 150, which may use a variety of different networking technologies, including wired, guided or line-of-sight optical, and radio frequency networking. In some embodiments, the network includes the public switched telephone network. Network connections established via the network may be fully-persistent, session-based, or intermittent, such as packet-based. While the facility typically operates in an environment such as is shown in FIG. 1A and described above, those skilled in the art will appreciate the facility may also operate in a wide variety of other environments.

Figure 2:
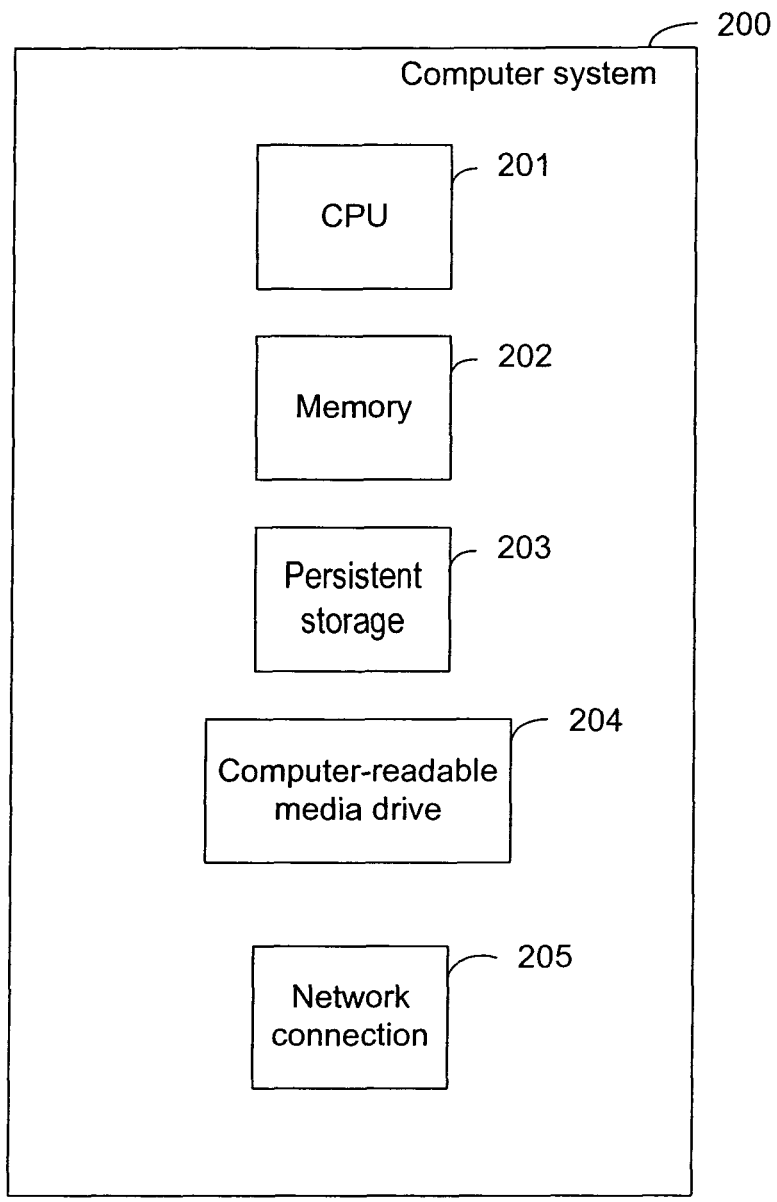
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes, including some or all of the server and client computer systems shown in FIG. 1A. These computer systems and devices 200 may include one or more central processing units ("CPUs") 201 for executing computer programs; a computer memory 202 for storing programs and data—including data structures—while they are being used; a persistent storage device 203, such as a hard drive, for persistently storing programs and data; a computer-readable media drive 204, such as a CD-ROM drive, for reading programs and data stored on a computer-readable medium; and a network connection 205 for connecting the computer system to other computer systems, such as via the Internet, to exchange programs and/or data—including data structures. While computer systems configured as described above are typically used to support the operation of the facility, those skilled in the art will appreciate that the facility may be implemented using devices of various types and configurations, and having various components.

It will be understood by those skilled in the art that the facility may transform inventory location information from a number of different source systems and from a number of different source software packages to a number of target systems and/or to a number of target software packages.

Figure 1B:
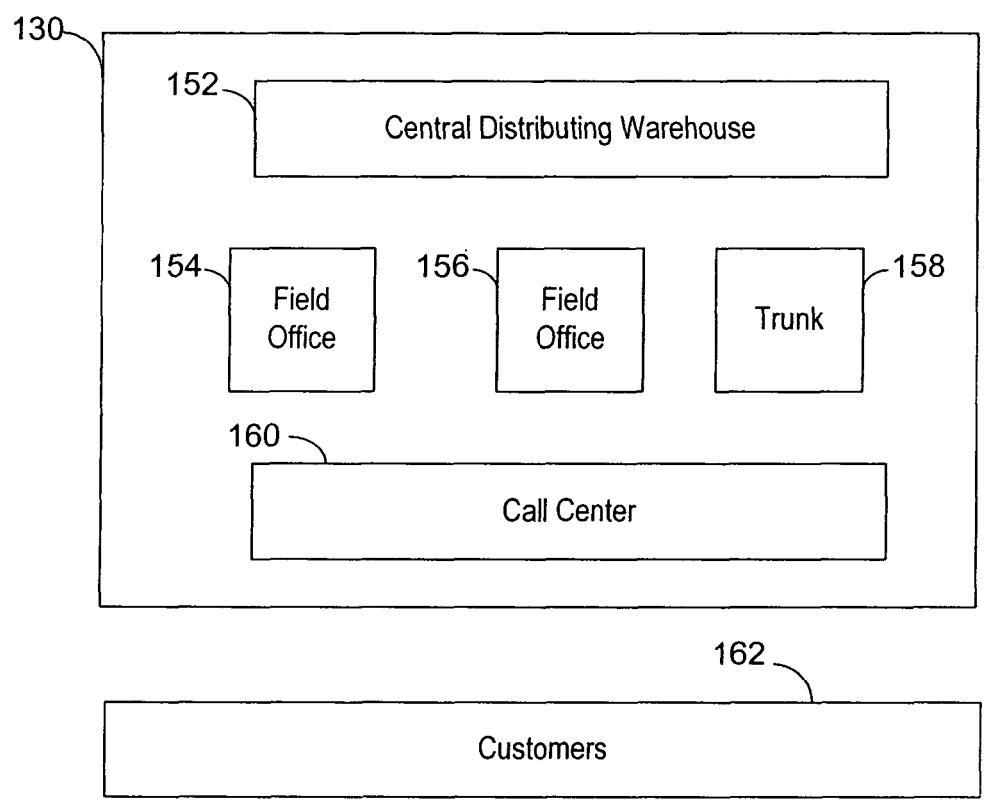
FIG. 1B is a block diagram that illustrates some business components of target system 130, according to certain embodiments.

FIG. 1B is a block diagram that illustrates some business components of target system 130. According to certain embodiments, such business components include a central distributing warehouse 152, a multiplicity of field offices 154, 156, a plurality of trunks, such as trunk 158, and one or more call centers, such as call center 160. Such business components in target system 130 use and store inventory location data in the target format. Further, one of the primary functions of target system 130 is to serve and interface with customers 162.

Figure 3A:
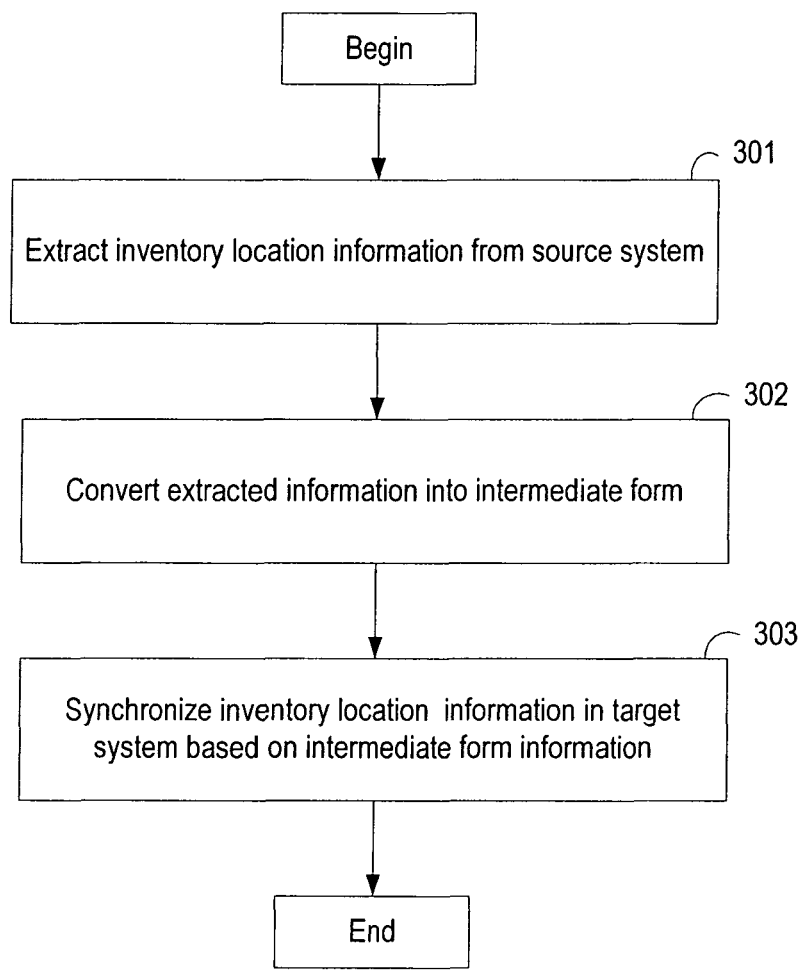
FIG. 3A is a high level flow diagram that shows some steps performed by the facility.

FIG. 3A is a high level flow diagram that shows some steps typically performed by the facility in order to convert inventory location information from the one or more source formats to the target format. At block 301, the facility extracts inventory location information from one or more source systems. At block 302, the facility converts the extracted information into an intermediate format. The intermediate format is described in greater detail herein, with reference to the common object data model. At block 303, the facility synchronizes the inventory location information from the source system with that of the target system by converting the inventory location information in intermediate format into the target format. After block 303, the steps as shown in FIG. 3A conclude.

The steps shown in FIG. 3A may be repeated periodically, either to convert inventory location information that is changed in the source system since the last conversion, and/or to convert one or more particularly selected inventory location information. The facility may perform conversions from various source systems on which is executing various source software packages, and/or convert inventory location information to various target systems executing different target software packages.

To further illustrate the process shown in FIG. 3A, an example of such a data conversion operation is discussed below. The data conversion operation will hereafter be referred to as data integration operation. The data integration operation may involve one or more integration application programs.

The data integration operation may be triggered in the source system. For example, assume that a new inventory item is added by manufacturing. Thus, new inventory location data, such as a new inventory location record corresponding to the new inventory item, is created in the source system. According to certain embodiments, the inventory location record contains information that includes the inventory location name, inventory location description, list of related addresses (shipping, receiving, billing), etc. When an inventory location record is created or modified in the source system, the data integration operation pushes the changes into the target system. In other words, the data integration operation will update the corresponding inventory location record in the target system, if such a record already exists. Otherwise, the data integration operation will create a new record in the target system.

Figure 3B:
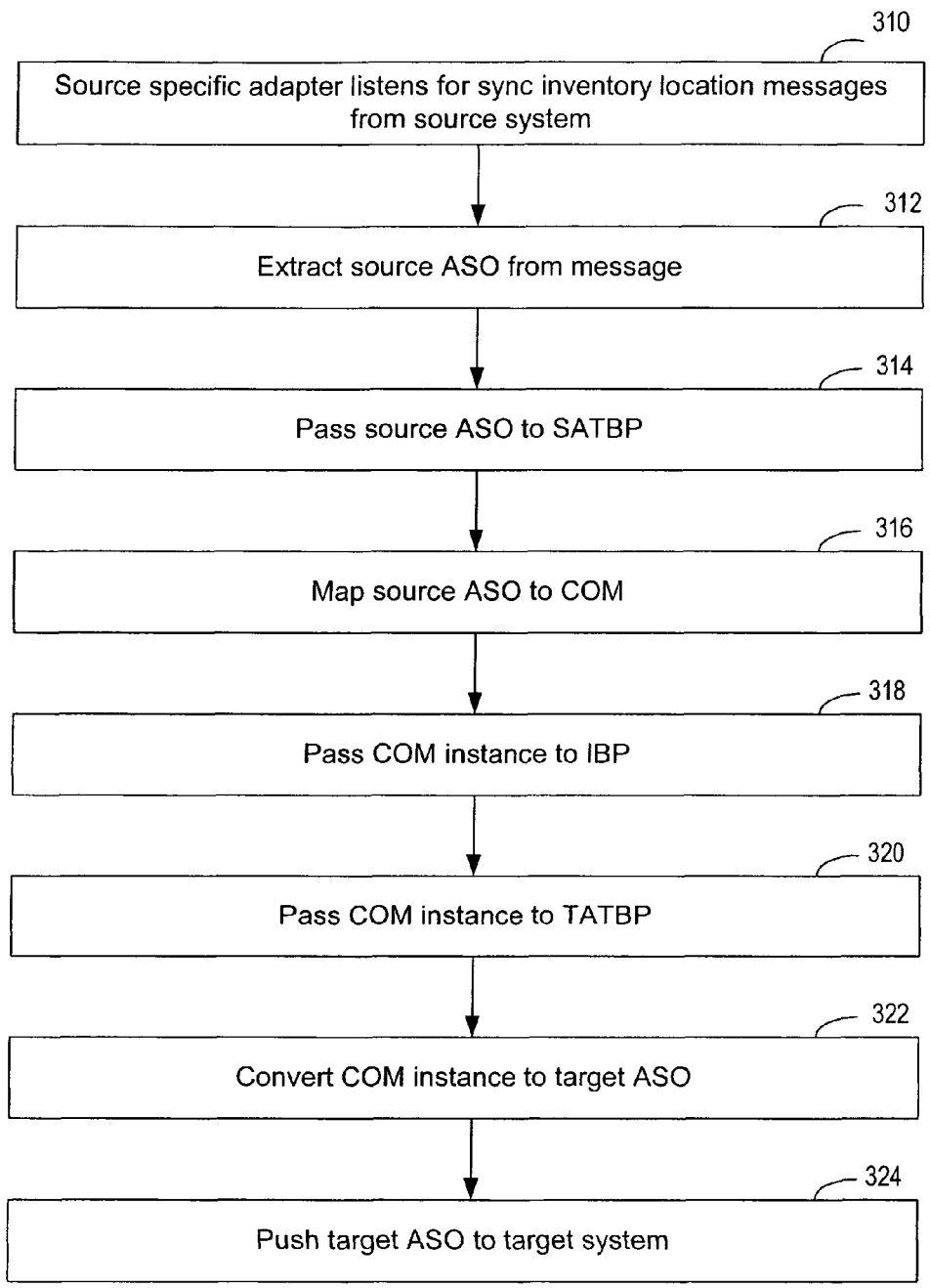
FIG. 3B is a flow diagram that illustrates further aspects of data integration operation, according to certain embodiments.

FIG. 3B is a flow chart that illustrates further aspects of the data integration operation, according to certain embodiments. At block 310, a source application specific adapter listens for synchronize inventory location messages from a source application program in the source system. According to certain embodiments, the source system is configured with a triggering mechanism that sends a message to the integration server when the inventory location information is updated or created in the source system (back-office). At block 312, a source application specific object (source ASO) that is associated with the message is extracted. At block 314, the source application specific adapter passes the source ASO to a source application transformation business process (SATBP) across an application specific interface (ASI). At block 316, the SATBP maps the source ASO to the inventory location common object model (COM) to create a corresponding inventory location COM instance. At block 318, the inventory location COM instance is passed to the synchronize inventory location integration business process (IBP) via the common service interface (CSI). At block 320, the synchronize inventory location IBP passes the COM instance to the target application transformation business process (TATBP). At block 322, the TATBP converts the inventory location COM instance into the target system's application specific object (target ASO). At block 324, the TATBP invokes the target application specific adapter via the ASI and pushes the target ASO into the target system (front-office). Thus, the inventory location information in the target system is synchronized with that of the source system.

FIG. 4 to FIG. 16 are data structure diagrams of the inventory common object model. Such an inventory common object model illustrates sample intermediate data structure content produced from corresponding inventory location information in the source format.

Figure 4:
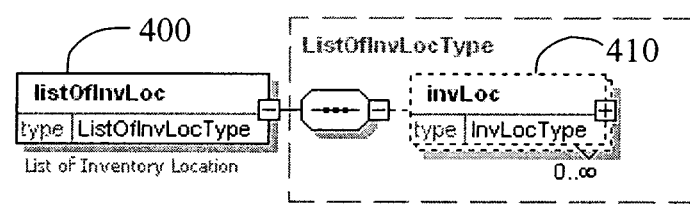
FIG. 4 to FIG. 16 are data structure diagrams that illustrate the inventory location common object model, according to certain embodiments.
Figure 5:
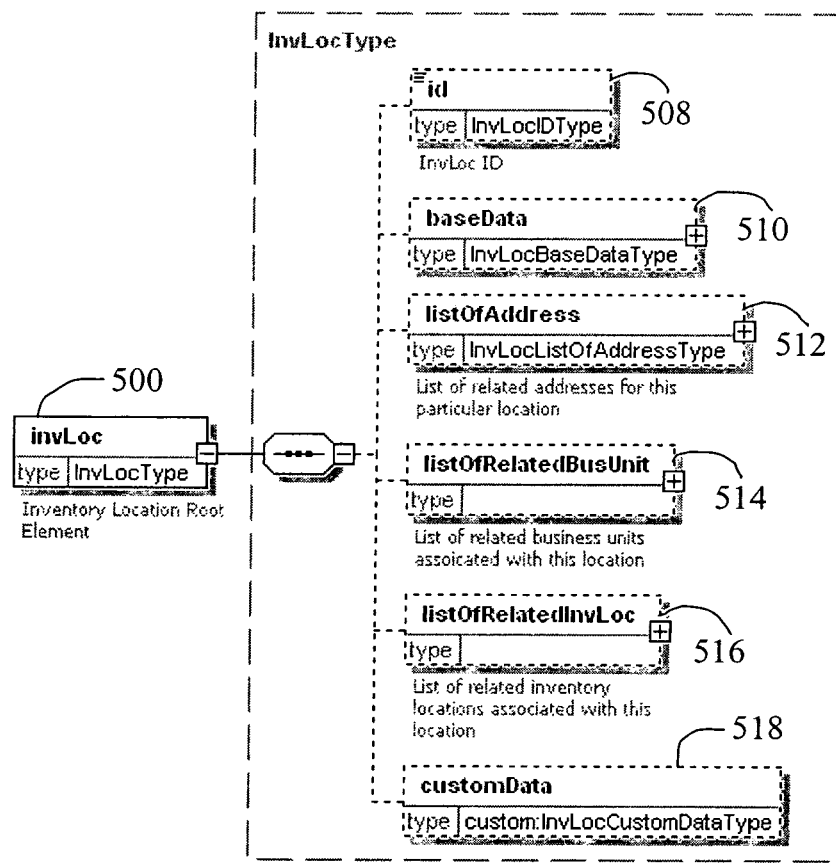

In FIG. 4, the illustrated intermediate data structure 400 is of type listOfInventoryLocation (listOfInvLoc), which may contain any number of inventoryLocation (invLoc) data structures 410. One such illustrated invLoc data structure 500 is shown in FIG. 5. In FIG. 5, invLoc data structure 500 includes an inventory location identifier 508 (ID), a baseData section 510, a listOfAddress section 512 (list of related addresses for this particular inventory location), a listOfRelatedBusUnit 514 (list of related business units associated with this particular inventory location) and a listOfRelatedInvloc section 516 (list of related inventory locations associated with this particular inventory location). In FIG. 5, invLoc data structure 500 may also include various other information such as various inventory location custom data 518.

Figure 6:
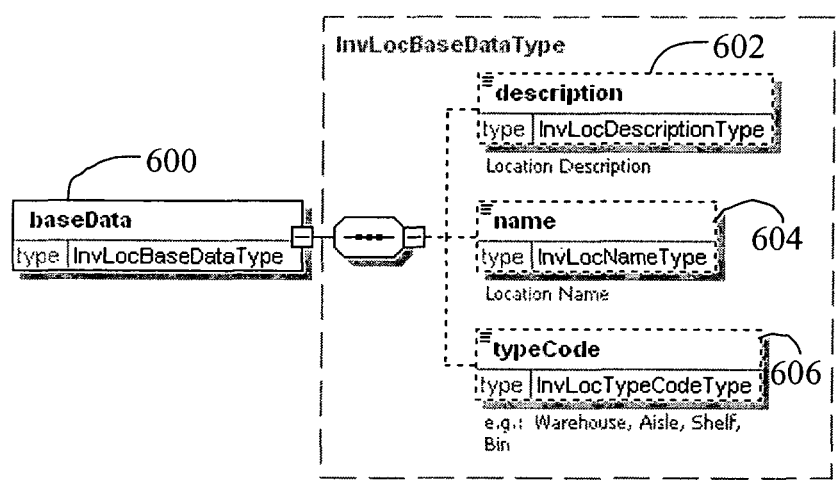

FIG. 6 illustrates the baseData section. In FIG. 6, the baseData section 600 includes identifying information about the inventory location that is obtained from the inventory location information in the first source format, including inventory location Description 602, inventory location Name 604, and inventory location typecode 606. Examples of inventory location typecode are "warehouse", "aisle", "shelf", "bin", etc.

Figure 7:
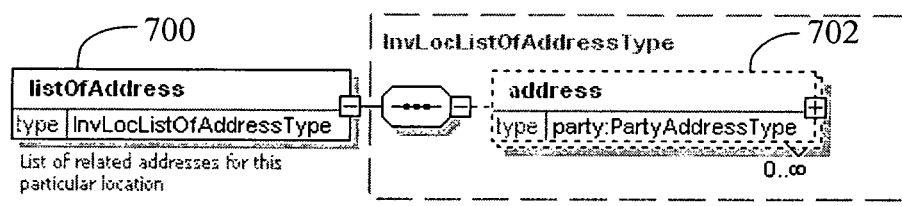

FIG. 7 illustrates the listOfAddress section. In FIG. 7, listOfAddress section 700 includes any number of addresses 702. Addresses 702 are discussed in greater detail herein with reference to FIG. 10.

Figure 8:
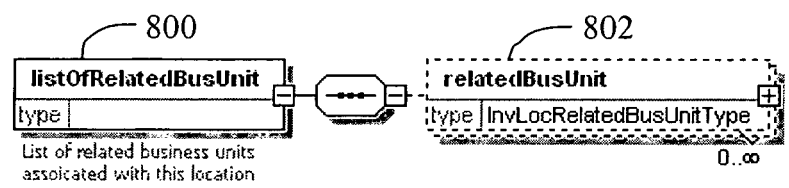

FIG. 8 illustrates the listOfRelatedBusUnit section. In FIG. 8, listOfRelatedBusUnit section 800 includes any number of relatedBusUnits 802 (related business units). The relatedBusUnits 802 are discussed in greater detail herein with reference to FIG. 11.

Figure 9:
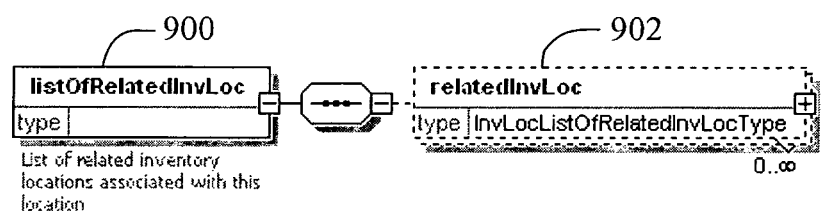

FIG. 9 illustrates the listOfRelatedInvLoc section. In FIG. 9, listOfRelatedInvLoc section 900 includes any number of relatedInvLoc 902 (related inventory locations). The relatedInvLoc 902 is discussed in greater detail herein with reference to FIG. 12.

Figure 10:
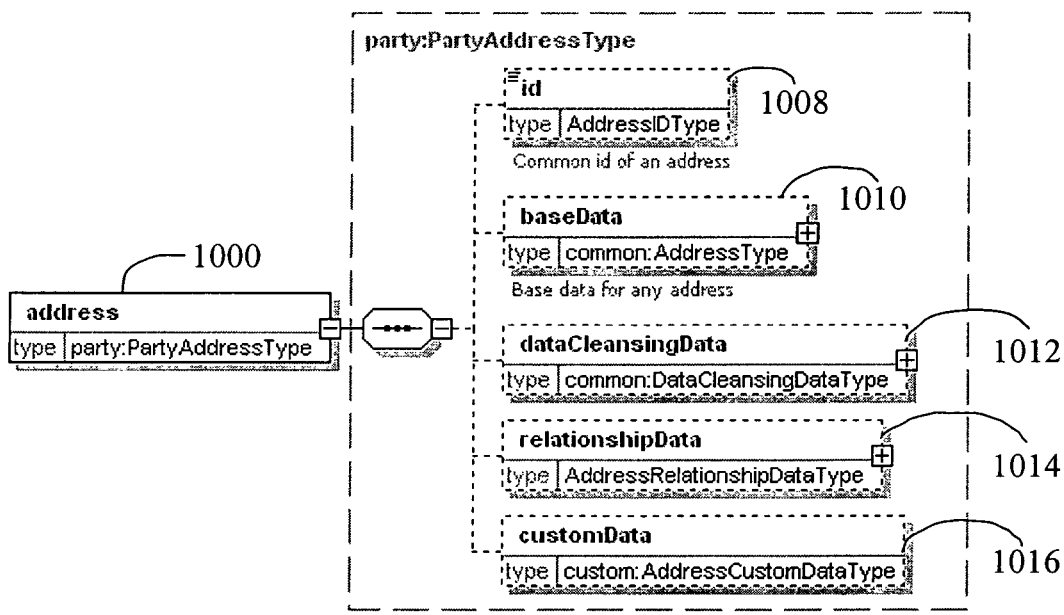

In FIG. 10, address section 1000 includes an common identifier 1008 (ID 1008) for the address, an address baseData section 1010, a dataCleansingData section 1012, and an address relationshipData 1014. In FIG. 10, listOfRelatedInvLoc section 1000 may also include various other information such as various address custom data 1016.

Figure 11:
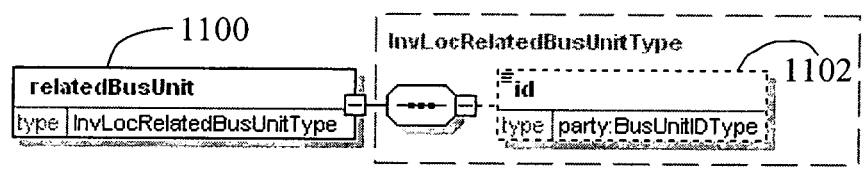

FIG. 11 illustrates the relatedBusUnit section. In FIG. 11, relatedBusUnit section 1100 includes a business unit identifier 1102 (ID 1102).

Figure 12:
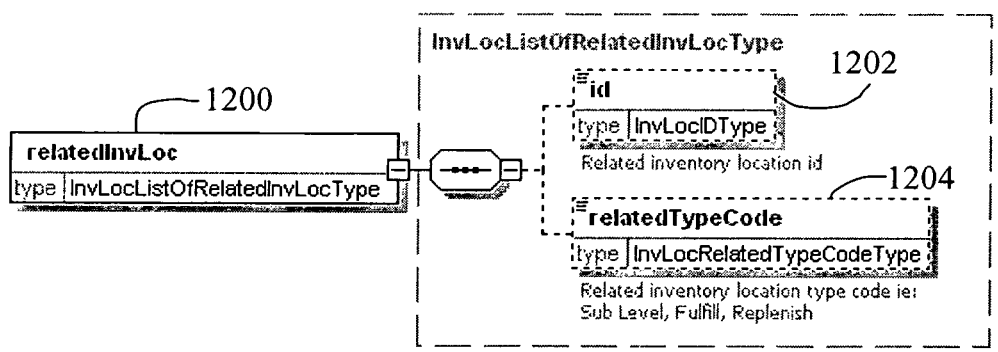

FIG. 12 illustrates the relatedInvLoc section. In FIG. 12, relatedInvLoc section 1200 includes a related inventory location identifier 1202 (ID 1202), and a relatedTypeCode 1204 (related inventory location type code). Examples of related inventory location type codes are "sub level", "fulfill", "replenish", etc.

Figure 13:
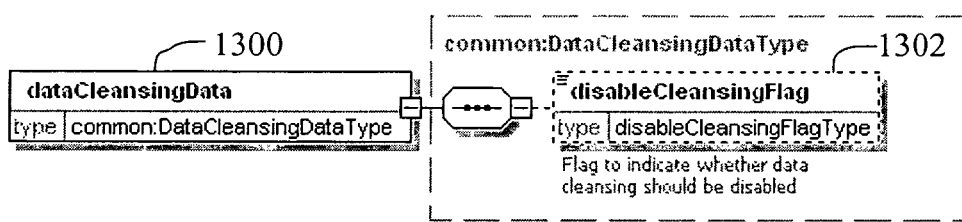

FIG. 13 illustrates the dataCleansingData section. In FIG. 13, dataCleansingData section 1300 includes a disableCleansingFlag 1302. Such a flag indicates whether data cleansing should be disabled.

Figure 14:
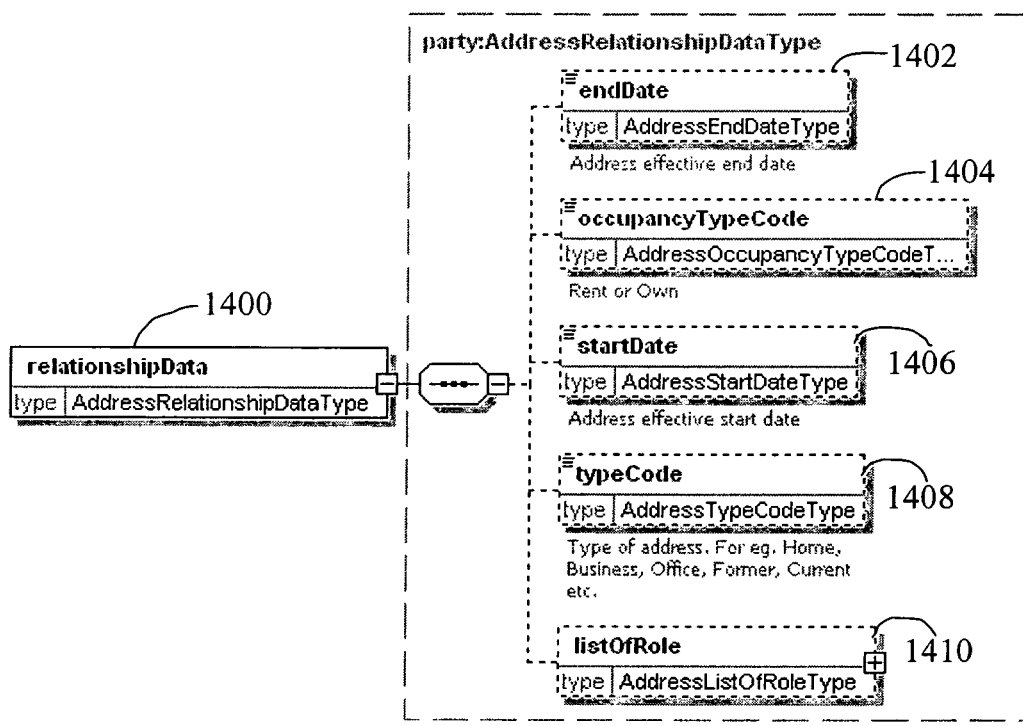

In FIG. 14, relationshipData section 1400 includes endDate 1402, occupancyTypeCode 1404, startDate 1406, typecode 1408, and listOfRole 1410. The endDate 1402 is the effective end date for this particular address. Examples of occupancyTypeCode 1404 are "rent", and "own". The startDate 1406 is the effective start date for this particular address. The typeCode 1408 contains information on the type of address. Examples of typeCode 1408 include "home", "business", "office", "former", "current", etc.

Figure 15:
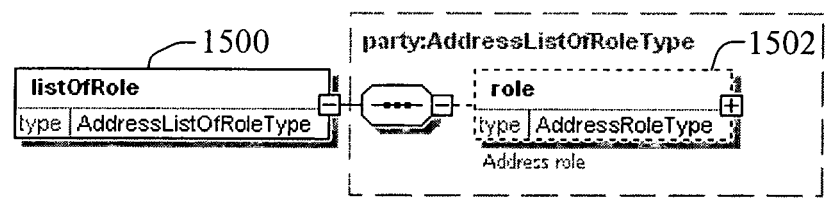
Figure 16:
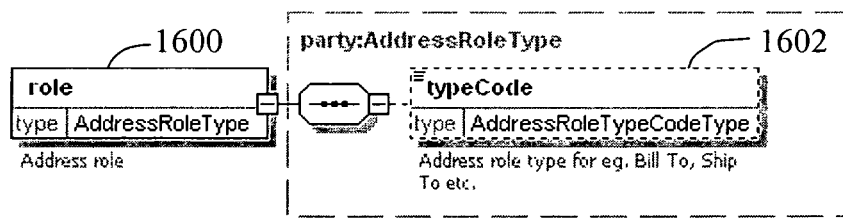

In FIG. 15, the listOfRole 1500 section (list of address roles) includes address role 1502. In FIG. 16, the address role 1600 section includes an address typeCode 1602 (an address role type). Examples of address role types include "Bill To", "Ship To", etc.

It will be appreciated by those skilled in the art that the above-described facility may be straightforwardly adapted or extended in various ways. For example, the facility may be used to transform various other kinds of inventory location information, and may be used to transform inventory location information between a variety of other formats.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any express definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

We claim:

1. A computer-implemented method comprising:
synchronizing existing target inventory location information with source inventory location information, wherein
the existing target inventory location information is stored in a target inventory location record at a target system,
the source inventory location information is stored at a plurality of source systems,
the plurality of source systems are ones of a plurality of computer systems,
the target system is another of the plurality of computer systems,
the synchronizing is performed using an integration server, and
the synchronizing comprises extracting the source inventory location information from a plurality of source inventory location records, wherein
    at least one of the plurality of source inventory location records is extracted from a first source system,
    at least one of the plurality of source inventory location records is extracted from a second source system,
    the source inventory location information from each of the plurality of source inventory location records is in one of a plurality of source formats, and
    each one of the plurality of source formats corresponds to at least one of the plurality of source systems,
generating intermediate source inventory location information by converting the source inventory location information into an intermediate format, wherein
    the converting the source inventory location information into the intermediate format comprises determining whether an intermediate record exists, wherein
    the intermediate record is associated with the source inventory location information,
    if the intermediate record exists, accessing a common object, wherein
    the common object is associated with the intermediate record,
    if the intermediate record does not exists, creating the intermediate record and the common object, and
    mapping the source inventory location information to the common object, and
    after the converting, the common object comprises the intermediate source inventory location information,
converting the intermediate source inventory location information into target inventory location information, wherein
    the target inventory location information is in a target format, and
    the target format corresponds to the target system, and
updating the target inventory location record using the target inventory location information.

2. The method of claim 1, further comprising:
using the target inventory location information in the target format to
create a target inventory location record in the target system if the target inventory location record does not exist.

3. The method of claim 1, further comprising:
extracting inventory location information in a second source format that is associated with a second source system that is distinct from the first source system, wherein
the second source system is one of the plurality of source systems;
converting the inventory location information in the second source format into inventory location information that is in the intermediate format;
converting the inventory location information in the intermediate format into inventory location information in the target format; and
using the inventory location information in the target format to perform at least one computer-implemented act from a set of computer-implemented acts comprising:
    creating a new inventory location record in the target computerized inventory management system; and
    updating an existing inventory location record in the target computerized inventory management system.

4. The method of claim 1, wherein
from the at least one of the plurality of source inventory location records from the first source system, the extracting extracts less than all first source system inventory location information, and
from the at least one of the plurality of source inventory location records from the second source system, the extracting extracts less than all second source system inventory location information.

5. The method of claim 1, wherein
the intermediate format comprises a list of inventory locations class with a hierarchy of data elements,
the hierarchy of data elements comprises a plurality of inventory location elements, and
each of the plurality of inventory location elements comprises:
    an identifier for identifying the inventory location element,
    a base data element for defining:
        a location description,
        a location name, and
        a location type code,
    a list of addresses element for defining a plurality of address elements from a party class,
    a list of related business units elements for defining a plurality of business units associated with the inventory, and wherein each of the plurality of business units associated with the inventory comprises an identifier element,
    a list of related inventory locations for defining a plurality of related inventory locations, and
    a custom data element for defining customized attributes for the inventory.

6. The method of claim 5, wherein each of the plurality of address elements comprises:
an address identifier element;
an address base data element, wherein
    the address data cleansing data element comprises a disable cleansing flag element;
an address data cleansing data element;
an address relationship data element; and
an address custom data element.

7. The method of claim 6, wherein the address relationship data element comprises:
an address effective end date element;
an address occupancy type code element;
an address effective start date element;
an address type code element; and
an address list of roles element.

8. The method of claim 5, wherein each of the plurality of related inventory locations comprises a related inventory location identifier element and a related inventory location type code element.

9. A non-transitory computer-readable storage medium storing one or more sequences of instructions for managing inventory, wherein execution of the one or more sequences of instructions by one or more processors causes the one or more processors to perform:

synchronizing existing target inventory location information with source inventory location information, wherein
  the existing target inventory location information is stored in a target inventory location record at a target system,
  the source inventory location information is stored at a plurality of source systems,
  the plurality of source systems are ones of a plurality of computer systems,
  the target system is another of the plurality of computer systems,
  the synchronizing is performed using an integration server, and
  the synchronizing comprises
    extracting the source inventory location information from a plurality of source inventory location records, wherein
      at least one of the plurality of source inventory location records is extracted from a first source system,
      at least one of the plurality of source inventory location records is extracted from a second source system,
      the source inventory location information from each of the plurality of source inventory location records is in one of a plurality of source formats, and
      each one of the plurality of source formats corresponds to at least one of the plurality of source systems,
    generating intermediate source inventory location information by converting the source inventory location information into an intermediate format, wherein
      the converting the source inventory location information into the intermediate format comprises determining whether an intermediate record exists, wherein
        the intermediate record is associated with the source inventory location information,
        if the intermediate record exists, accessing a common object, wherein
          the common object is associated with the intermediate record,
        if the intermediate record does not exists, creating the intermediate record and the common object, and
        mapping the source inventory location information to the common object, and
      after the converting, the common object comprises the intermediate source inventory location information,
    converting the intermediate source inventory location information into target inventory location information, wherein
      the target inventory location information is in a target format, and
      the target format corresponds to the target system, and
    updating the target inventory location record using the target inventory location information.

10. The non-transitory computer-readable storage medium of claim 9, further comprising:
  using the target inventory location information in the target format to
    create the target inventory location record in the target system if the target inventory location record does not exist.

11. The non-transitory computer-readable storage medium of claim 9, further comprising:
  extracting inventory location information in a second source format that is associated with a second source system that is distinct from the first source system, wherein
    the second source system is one of the plurality of source systems;
  converting the inventory location information in the second source format into inventory location information that is in the intermediate format;
  converting the inventory location information in the intermediate format into inventory location information in the target format; and
  using the inventory location information in the target format to perform at least one computer-implemented act from a set of computer-implemented acts comprising:
    creating a new inventory location record in the target computerized inventory management system; and
    updating an existing inventory location record in the target computerized inventory management system.

12. The non-transitory computer-readable storage medium of claim 9, wherein the intermediate format comprises a list of inventory locations class with a hierarchy of data elements.

13. The non-transitory computer-readable storage medium of claim 12, wherein the hierarchy of data elements comprises a plurality of inventory location elements comprising additional elements.

14. The non-transitory computer-readable storage medium of claim 13, wherein each of the plurality of inventory location elements comprises an identifier for identifying the inventory location element.

15. The non-transitory computer-readable storage medium of claim 13, wherein each of the plurality of inventory location elements comprises a base data element for defining:
  a location description;
  a location name; and
  a location type code.

16. The non-transitory computer-readable storage medium of claim 13, wherein each of the plurality of inventory location elements comprises a list of addresses element for defining a plurality of address elements from a party class.

17. The non-transitory computer-readable storage medium of claim 13, wherein each of the plurality of inventory location elements comprises a list of related business units elements for defining a plurality of business units associated with the inventory.

18. The non-transitory computer-readable storage medium of claim 13, wherein each of the plurality of inventory location elements comprises a list of related inventory locations for defining a plurality of related inventory locations.

19. The non-transitory computer-readable storage medium of claim 13, wherein each of the plurality of inventory location elements comprises a custom data element for defining customized attributes for the inventory.

20. The non-transitory computer-readable storage medium of claim 16, wherein each of the plurality of address elements comprises:
  an address identifier element;
  an address base data element;
  an address data cleansing data element;
  an address relationship data element; and
  an address custom data element.

21. The non-transitory computer-readable storage medium of claim 20, wherein the address data cleansing data element comprises a disable cleansing flag element.

22. The non-transitory computer-readable storage medium of claim 20, wherein the address relationship data element comprises:
an address effective end date element;
an address occupancy type code element;
an address effective start date element;
an address type code element; and
an address list of roles element.

23. The non-transitory computer-readable storage medium of claim 17, wherein each of the plurality of business units associated with the inventory comprises an identifier element.

24. The non-transitory computer-readable storage medium of claim 18, wherein each of the plurality of related inventory locations comprise a related inventory location identifier element and a related inventory location type code element.

25. A computer-implemented method comprising:
synchronizing target inventory location information with source inventory location information, wherein
the synchronizing is performed using an integration server, and
the synchronizing comprises
extracting each of a plurality of source inventory location objects from a corresponding one of a plurality of source inventory location systems, wherein
the source inventory location objects comprise the source inventory location information,
at least one of the plurality of source inventory location objects is extracted from a first source system of the plurality of source inventory location systems,
at least one of the plurality of source inventory location objects is extracted from a second source system of the plurality of source inventory location systems,
each of the plurality of source inventory location systems employs a corresponding one of a plurality of source formats,
each of the plurality of source inventory location objects is stored in a source format of the source formats employed by the corresponding one of the plurality of source inventory location systems, and
the plurality of source systems are ones of a plurality of computer systems,
generating intermediate source inventory location information, wherein
the intermediate source inventory location information is in an intermediate format,
the generating comprises
converting the each of the source inventory location objects into a corresponding one of the plurality of common objects, wherein
the converting the each of the source inventory location objects into the corresponding one of the plurality of common objects comprises
determining whether each corresponding intermediate record exists, wherein
the each corresponding intermediate record is associated with the each of the source inventory location objects,
if the each corresponding intermediate record exists, accessing each corresponding common object out of the plurality of common objects, wherein
the each corresponding common object is associated with the each corresponding intermediate record,
if the each corresponding intermediate record does not exists, creating the each corresponding intermediate record and the each corresponding common object, and
mapping the each of a plurality of source inventory location objects to the each common object, wherein
the plurality of common objects comprise the intermediate source inventory location information, and
after the converting, each of the plurality of common objects corresponds to a source inventory location object of the plurality of source inventory location objects, and
converting the intermediate source inventory location information into the target inventory location information, wherein
the target inventory location information is in the target format,
determining whether a target inventory location record exists at a target system,
if the target inventory location record exists at the target system, updating the inventory location record using the target inventory location information, and
if the target inventory location record does not exist at the target system,
creating the target inventory location record at the target system.

26. The method of claim 25,
wherein
the target system is another of the plurality of computer systems,
the target inventory location record is in the target format,
the updating is performed by the integration server, and
the updating comprises
causing the integration server to push the target inventory location information to the target system, and
further comprising, if the target inventory location record does not exist at the target system,
storing the target inventory location information in the target inventory location record.

27. The method of claim 1, wherein
the synchronizing is performed in response to a trigger received by the integration server, and
the trigger indicates that at least one of the plurality of source systems has indicated that the synchronizing should be performed.

28. The method of claim 1, wherein the converting comprises:
generating updated target inventory location information by updating the target inventory location record using the target inventory location information, wherein
the updating comprises
causing the integration server to push the target inventory location information to the target system.

29. The method of claim 2, further comprising:
in response to the creation of the target inventory location record in the target system, transmitting an update message, wherein
the update message is configured to update the record associated with the source inventory location information.

30. The method of claim 29, further comprising:
in response to receiving the update message, updating a source inventory location record, wherein
the source inventory location record is associated with the source inventory location information, and
the updating causes the source inventory location record to indicate the target inventory location record.

* * * * *

UNITED STATES PATENT AND TRADEMARK OFFICE
CERTIFICATE OF CORRECTION

PATENT NO.         : 8,489,470 B2  
APPLICATION NO.    : 10/696156  
DATED              : July 16, 2013  
INVENTOR(S)        : Kahlon et al.

Page 1 of 1

It is certified that error appears in the above-identified patent and that said Letters Patent is hereby corrected as shown below:

On Title page, column 2, item (56), under Other Publications, line 4, delete "umit" and insert
-- unit --, therefor.

On Title page 2, column 2, item (56), under Other Publications, line 12, delete "entriched" and insert
-- enriched --, therefor.

On Title page 2, column 2, item (56), under Other Publications, line 15, delete "Conventry:" and insert
-- Coventry: --, therefor.

On Title page 3, column 1, item (56), under Other Publications, line 4, after "XML" insert -- for --.

Signed and Sealed this
Twenty-ninth Day of October, 2013

Teresa Stanek Rea
*Deputy Director of the United States Patent and Trademark Office*